United States Patent Office 3,271,394
Patented Sept. 6, 1966

3,271,394
ALPHA-INDOLYL-3-ACETIC ACID ESTERS
Tsung-Ying Shen, Westfield, N.J., assignor to Merck & Co., Inc., Rahway, N.J., a corporation of New Jersey
No Drawing. Filed Dec. 31, 1964, Ser. No. 422,567
7 Claims. (Cl. 260—247.2)

This invention relates to new chemical compounds. More particularly, it relates to a new class of compounds of the indole series. Still more particularly, it is concerned with new esters of α-(3-indolyl) lower aliphatic acids having an aromatic carboxylic acyl radical of less than 3 fused rings attached to the nitrogen atom of the indole ring.

This application is a continuation-in-part of my copending application Serial No. 286,935, filed June 11, 1963, now issued to patent as No. 3,161,654, which is a divisional continuation-in-part of my copending application Serial No. 164,615, filed January 5, 1962, now abandoned. This latter application is in turn a continuation-in-part of my application Serial No. 97,434, filed March 22, 1961 and now abandoned.

These aforesaid applications described certain N-substituted derivatives of α-(1-aromatic carboxylic acyl-3-indolyl) aliphatic acids and certain of their simpler esters, which are useful because of their high degree of anti-inflammatory activity. The novel compounds of this invention are hitherto unknown esters of α-(3-indolyl) aliphatic acids which are especially useful because they possess varying degrees of lipid and water solubility, gastrointestinal tract irritability, analgesic activity, anti-pyretic activity, anti-inflammatory activity, anti-spasmodic activity and adaptability for sustained release dosage forms because of the varying rates of hydrolysis to the free acids before and after absorption. Certain of these properties may be especially important when dealing with conditions requiring anti-inflammatory treatment where the patient is suffering from other pathological conditions such as high fever or intestinal ulcers.

The new aroyl and heteroaroyl indolyl aliphatic acid esters of this invention have the general formula:

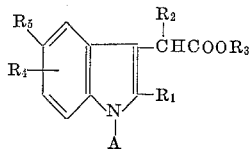

wherein
A is a substituted or unsubstituted aromatic carboxylic acyl radical, preferably containing less than three fused rings, more specifically, an aroyl or heteroaroyl radical of the formula ArC=O wherein Ar is, for example, phenyl, naphthyl or biphenyl or the formula HetC=O wherein Het is, for example, furyl, thienyl, pyrryl, thiazolyl, thiadiazolyl, pyrazinyl, pyridyl, pyrazolyl, imidazolyl, oxazolyl, pyrimidinyl or a benz derivative thereof such as benzisoxazolyl, benzimidazolyl, benzofuranyl, benzothiazolyl, benzotriazolyl, benzoxazolyl, benzothienyl, indazolyl or isoindazolyl.

$R_1$ is hydrogen or a lower alkyl, lower alkenyl cycloalkyl, aryl or aralkyl radical;

$R_2$ is hydrogen or a lower alkyl or lower alkenyl radical;

$R_3$ is lower alkenyl, lower alkynyl, cyclic lower alkyl and phenyl radicals or substituted lower alkyl, lower alkenyl, lower alkynyl, cyclic lower alkyl and phenyl radicals;

$R_4$ is hydrogen, lower alkyl, lower alkoxy, fluorine or trifluoromethyl; and $R_5$ is hydrogen, hydroxyl, halogen, lower alkyl, aryl, aminoalkyl, lower alkyl substituted amino alkyl, haloalkyl, lower alkoxy, aryloxy, aralkyoxy, alkenyloxy, alkynyloxy, cycloalkylalkoxy, cycloalkoxy, amino, lower alkylamino, di-lower alkylamino, lower alkanolamino, arylamino, alkyl-arylamino, cyano, nitro, mercapto, lower alkylthio, aralkylthio, 1-pyrrolidino, 4-methyl-1-piperazinyl, 4-morpholinyl, bis (hydroxy lower alkyl) amino, and di-lower alkyl sulfamoyl.

These compounds when substituted with an amino or substituted amino group may exist and may be utilized either as a free base or the acid addition salt thereof. It is specifically intended to include within the purview of the invention, the pharmaceutically acceptable acid addition salts which these compounds form with acids having pharmaceutically acceptable anions. The term "pharmaceutically acceptable anion" has a definite meaning to one skilled in the art. It is defined as a nontoxic anion of any of the simple acids used therapeutically to neutralize basic medicinal agents when the salts thereof are to be utilized therapeutically. These acids include both inorganic and organic acids, for example, hydrochloric, hydrobromic, hydriodic, sulfuric, succinic, phosphoric, maleic, tartaric, citric, glycolic and others. The pharmaceutical activity of the molecule is primarily a function of the cation. The anion serves generally to supply electrical neutrality.

In the preferred compounds of this invention, A is phenyl and substituted at the para-position with chlorine. $R_1$ is lower alkyl such as methyl or ethyl; $R_2$ is hydrogen or lower alkyl; $R_3$ is a di-lower alkylamino alkyl radical; $R_4$ is hydrogen and $R_5$ is lower alkyl or lower alkoxy such as methyl, ethyl, propyl, t-butyl, methoxy, ethoxy, i-propoxy and the like. Especially preferred compounds include the acid addition salts of di-lower alkylamino alkoxy esters such as the hydrochloride, phosphate and citrate of the β-dimethylamino ethyl ester of α-(1-p-chlorobenzoyl-2-methyl-5-methoxy-3-indolyl) acetate.

$R_3$ as aforesaid is selected from the group consisting of lower alkenyl, lower alkynyl, cyclic lower alkyl and phenyl radicals and substituted lower alkyl, lower alkenyl, lower alkynyl, cyclic lower alkyl and phenyl radicals. More specifically, $R_3$ may be allyl, 2-methylbuten-2-yl, ethynyl, butyn-2-yl, cyclohexyl, cyclopentyl, cyclopropylmethyl, p-acetaminophenyl, o-carboxylphenyl, o-carboamidophenyl, lower alkoxy substituted lower alkyl such as β-methoxyethyl, β-ethoxyethyl and methoxymethyl. $R_3$ may also be cyclic lower alkyl such as tetrahydrofuryl or polyalkoxy lower alkyl such as the polyalkyl ethers of sugar alcohols, for example polymethyl ethers of sorbitol and mannitol. In such compounds, the carbon chain may contain from two to six carbon atoms. $R_3$ preferably is a di-lower alkylamino lower alkyl radical such as β-di-lower alkylaminoethyl.

The invention also includes within its scope compounds wherein $R_3$ is a cyclic lower alkylamino lower alkyl radical derived from N-(β-hydroxyethyl)piperidine, N-(β-hydroxyethyl)pyrrolidine, N-(hydroxymethyl)pyrrolidine, N-(β-hydroxyethyl)morpholine, 4-dimethylamino-cyclohexyl, N-methyl-2-hydroxymethyl pyrrolidine, N-methyl-2-hydroxymethyl piperidine, N-ethyl-3-hydroxypiperidine, 3-hydroxy-quinuclidine and N-(β-hydroxyethyl)-N'-methyl-piperazine.

A critical feature of these compounds is the presence of an aroyl or heteroaroyl radical attached to the N-1 position of the indole. Those acyl groups may be further substituted in the aromatic ring with hydrocarbon groups or with functional substituents. Thus, suitable aroyl substitutents are the benzoyl and naphthoyl groups. The aromatic rings of such groups may contain, and in the preferred compounds do contain, at least, one functional substituent. This substituent may be a hydroxy or an etherified hydroxy (hydrocarbonoxy) group such as a lower alkoxy, e.g., methoxy, ethoxy, isopropoxy, allyloxy, propoxy, an aryloxy or aralkoxy group, e.g., phenoxy, benzyloxy, halobenzyloxy, lower alkoxybenzyloxy and like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and aralkylthio or arylthio groups, e.g., benzylthio and phenylthio. The N-1 aroyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamoyl, benzylthiomethyl, cyano or dialkyl sulfamoyl radical. Further, it may contain a carboxy substituent, or a derivative thereof, such as an alkali metal salt or a lower alkyl ester of the carboxy radical, an aldehyde, azide, amide, hydrazide and the like or an aldehyde derivative of the type represented by acetals or thioacetals. In the preferred compounds, the N-1 aroyl radical is benzoyl and the functional substituent is in the para-position of the six membered ring.

As aforesaid, the N-1 group may be a heteroacyl substituent, and more precisely a heteroaroyl substituent of the formula

wherein Het represents a five- or six-membered hetero aromatic ring which may be part of a fused ring system containing less than three fused rings.

The α-(3-indolyl)-aliphatic acid esters described herein are preferably derived from lower aliphatic acids, more specifically, lower alkanoic and lower alkenoic acids, such as acetic, propionic, butyric, valeric, acrylic, crotonic, pent-2-enoic, hex-2-enoic, 3-methyl-pent-2-enoic, α-allylacetic, α-methylallyl acetic and like acids.

The 2-position of the indole ring nucleus ($R_1$ in the above formula), may be hydrogen although it is preferred that there be present at this position of the molecule a hydrocarbon radical having less than nine carbon atoms. Lower alkyl groups such as methyl, ethyl, propyl or butyl are the most satisfactory. The lower alkenyl radicals such as vinyl and allyl also may be present.

The following compounds are representative of those contemplated by this invention. Those and others may be prepared by the procedures discussed hereinbelow: allyl α-(1-p-chlorobenzoyl-2-methyl-5 - methoxy - 3 - indolyl)-acetate; decyl α-(1-p-methoxybenzoyl-2,4-dimethyl-3-indolyl)-propionate; cyclohexyl α-[1-(p-methylthiobenzoyl)-2-methyl-5-methoxy-3 - indolyl] - butyrate; β-diethylaminoethyl α-[1-2(2'-furoyl)-2,5-dimethyl-3 - indolyl] - acetate; p-chlorophenyl -α-[1-(1-naphthoyl)-2-methyl-6-nitro-3-indolyl]-acrylate; β-ethoxyethyl 2-[1-(2-thenoyl)-2-methyl-5-methoxy-3-indolyl]-3-methyl-pent-2-enoate; cyclopropylmethyl α-[1-(6-fluoro-6-methyl - benzimidazole - 5 - carbonyl)-2-methyl-5-methoxy-3-indolyl]-acetate.

The α-(1-aroyl or heteroaroyl-3-indolyl)-lower aliphatic acids and derivatives thereof which may be used to prepare the valuable esters of this invention may be synthesized by acylation of the α-(3-indolyl)-lower aliphatic acid, amide or ester having the desired substituents on the other positions of the indole nucleus. The acids can be esterified directly as will be described below. Amides or simple esters may be converted to the free acids and in turn esterified. Alternatively, as will be described in detail hereinbelow, the desired esters may be prepared by reaction between an appropriately substituted phenylhydrazine and selected levulinic esters. The α-(3-indolyl)-lower aliphatic acid esters prepared may then be acylated.

It is preferred to carry out the acylation of an ester of amide derivative of the lower aliphatic acid. If the free acid is desired for conversion into an ester of this invention, the simple ester intermediate may be converted under suitable reaction conditions to the free acid. It has been observed that the 1-aroyl or heteroaroyl substituent is easily hydrolyzed under conditions normally employed for saponification of an ester of the free acid. For this reason, care must be taken in converting the α-(1-aroyl or heteroaroyl-3-indolyl)-lower aliphatic acid esters to the corresponding free acids. One convenient method of accomplishing this conversion comprises acylation of the benzyl ester and subsequent hydrogenolytic removal of the benzyl ester. Alternatively, other esters such as t-butyl esters which are amenable to selected removal by other treatment such as heating above 210° C. or by heating at 25° C. to 110° C. in the presence of a catalytic amount of an aryl sulfonic acid or other acids may be utilized. Amides, as aforesaid, may be converted acids for subsequent prepartion of the esters of this invention. The free acids are formed by reaction of the amides with a stoichiometric quantity of nitrous acid in an inert solvent.

In one procedure for the preparation of the esters of this invention the α-(1-aroyl or heteroaroyl-3-indolyl)-lower aliphatic acids are converted to symmetrical anhydrides in the presence of a mild dehydrating agent such as dicyclohexyl carbodiimide. Alternatively, the acid may be converted to a mixed anhydride by treatment with a non-hydroxylic base such as for example tertiary alkyl amine, pyridine and the like to yield an acid salt followed by treatment with an acid halide such as for example an alkyl or aryl chloroformate, phosphorous oxychloride, thionyl chloride and the like. The symmetrical or mixed anhydride is then reacted with the selected alcohol in the presence of a nonhydroxylic base such, for example, as those mentioned above to yield the corresponding ester.

Acylation at the 1-position is preferably conducted by treating the α-(3-indolyl)-lower aliphatic acid starting material with an alkali metal hydride such as sodium hydride to form e.g., a sodium salt and then intimately contacting said salt with an aroyl or heteroaroyl acid halide in an anhydrous solvent medium. It is preferred to employ solvents such as dimethylformamide, dimethylformamide-benzene, benzene, toluene or xylene. It is preferred to carry out the acylation at about room temperature although lower temperatures may be employed if the particular reactants are unduly susceptible to decomposition.

An alternative method of acylating the 1-position is by use of a phenolic ester of the acylating acid, such as the p-nitrophenyl ester. This latter is prepared by mixing the acid and p-nitrophenol in tetrahydrofuran and adding dicyclohexyl carbodiimide in tetrahydrofuran slowly. The dicyclohexylurea which forms is removed by filtration and the nitrophenylester is recovered from the filtrate. Alternatively, there can also be used the anhydride, azide or thiophenolic ester of the acylating acid. Whichever is used, the acylation of the α-(3-indolyl)-lower aliphatic acid starting material is achieved by forming a sodium salt of said material with sodium hydride in an anhydrous solvent and adding the nitrophenylester.

The α-(1-aroyl or heteroaroyl-3-indolyl)-lower aliphatic acid ester compounds of this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 10–2000 mg. per day are useful in control of arthritic conditions, depending on the activity of the specific compound and the reaction sensitivity of the patient.

As aforesaid, the compounds of this invention are especially useful because of their varying degrees of lipid and water solubility and for various other physiological effects.

The indolyl aliphatic acid compounds employed as starting compounds in the reaction discussed above and having the formula:

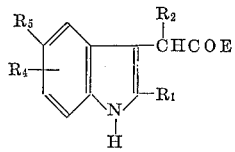

wherein $R_1$, $R_4$ and $R_5$ have the previously defined meaning, $R_2$ is hydrogen or lower alkyl and E is amino or an ester group and may be synthesized in various ways. When $R_1$ is hydrogen or methyl, it is preferred to form such compounds by reacting together an appropriately substituted phenylhydrazine and a substituted levulinic ester or amide to form an intermediate phenylhydrazone which cyclizes under the reaction conditions to the indole compound. The reaction may be indicated by the following equation in which $R_1$, $R_4$, $R_5$ and E have the same meaning as above and $R_2$ is hydrogen or methyl.

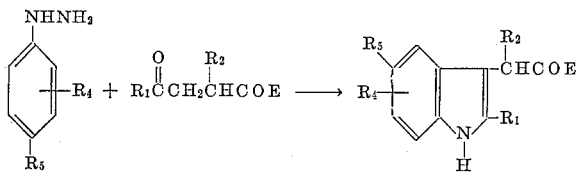

The reaction is normally carried out in a lower alkanol such as methanol, ethanol, isopropanol or butanol containing an acid such as hydrochloric, hydrobromic, sulfuric or acetic acid or in aqueous mineral acid such as concentrated hydrochloric, hydrobromic, sulfuric or acetic acid or other Lewis acids such as zinc chloride, boron trifluoride, stannic chloride and the like. The acid serves as a catalyst in the condensation and ring closure reactions leading to the 1-unsubstituted indole. When the substituted levulinic esters are used, the nature of the ester is not critical. It may, in fact, be selected so that a compound of this invention is formed directly. To avoid the possibility of transesterification the alcohol used as the solvent medium is preferably the same as the alcohol moiety of the ester. When $R_1$ is hydrogen, it is convenient to employ the aldehyde in the form of an acetal, e.g., methyl γ,γ-dimethoxy butyrate. An acid addition salt of the phenylhydrazine reactant, for example the hydrochloride, is normally preferred over the free base for practical reasons, although such salts and the base are equivalent in the reaction itself.

Formation of the α-(3-indolyl)-aliphatic acid, or ester thereof, is brought about at elevated temperatures, good results being obtained by refluxing the reaction mixture for at least about 15 minutes. Longer reaction times are not harmful and may be used if desired. The desired compound is recovered from the reaction mixture and purified by techniques such as solvent extraction, chromatography and/or distillation. Since the 1-unsubstituted esters are low melting solids, they are conveniently purified by distillation under reduced pressure. They are saponified by treatment with an alkali metal hydroxide.

The substituted phenylhydrazines employed as one of the starting materials in this synthesis are prepared by known methods. One convenient method is by diazotization of the appropriately substituted aniline to give the diazo compound, treatment of the latter with stannous chloride to form a tin complex, and decomposition of this complex to the phenylhydrazine with sodium hydroxide.

The 1-acyl group in α-(1-acyl-3-indolyl) aliphatic acids and esters of this invention are, as has been mentioned earlier, easily hydrolyzed under the conditions normally used to saponify an ester. For this reason, the benzyl ester of the intermediate α-(1-unsubstituted-3-indolyl) acids are convenient starting materials. These are obtained by forming the free α-(1-unsubstituted-3-indolyl) aliphatic acid and esterifying this with benzyl alcohol in an inert solvent with an acid catalyst (sulfuric, aryl sulfonic acids, etc.). Alternatively, the intermediate benzyl ester is synthesized directly by using the benzyl ester of the proper levulinic acid in the original synthesis of the indole ring, or is formed by base catalyzed ester exchange from other esters. After acylation of the indole nitrogen of these benzyl ester intermediates, the benzyl group can be removed clearly by hydrogenolysis, a process which leaves the 1-acyl group untouched.

Alternatively, it is possible first to produce an indole of the formula:

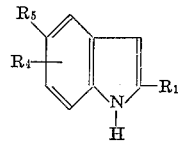

wherein $R_1$, $R_4$ and $R_5$ have the same meaning as above, and then to introduce the carboxylic acid residue at the 3-position. This is accomplished by treating the indole of the above formula under Mannich reaction conditions with formaldehyde and dialkylamine to produce a substituted gramine, subsequently reacting this latter compound with an alkali metal cyanide in a lower alkanol, and finally hydrolyzing with a strong base such as sodium or potassium hydroxide.

While this method of introducing the aliphatic acid residue at the 3-position after elaboration of the indole ring is, of course, generally applicable to compounds having the structure shown above, it is particularly useful for making compounds of this invention wherein $R_1$ is an alkyl radical other than methyl, such as the 2-ethyl-2-propyl, 2-allyl and like substances. Compounds of the above formula, unsubstituted in the 3-position, are readily prepared following the procedures set forth in columns 2 and 3 of U.S. Patent No. 2,825,734. Products where R may be acyloxy, halo, cyano, carboxy, carbalkoxy, alkyl, aryl, aralkyl, nitro or hydrocarbonoxy are prepared via the synthesis beginning from a substituted 2-nitro benzaldehyde or 2-nitrotoluene.

The synthesis of various compounds of this invention having on the indole ring system a 5-substituent which has a nitrogen attached to the homocyclic ring of the indole is generally based on the 5-nitro compound. This is transformed into the desired 5-substituent. Such transformation may be before or after acylation of the 1-position, depending on the extent to which the desired 5-substituent may interfere with the acylation. If such interference is possible, the 1-acylation should be carried out on the 5-nitro indole and the nitro later transformed into the desired 5-substituent. Such transformation can be carried out in a number of ways. Reduction of the 5-nitro groups gives a 5-amino group. Reaction of the amino with alkyl halides gives mono and dialky amino groups. If the alkyl halide is a dihaloalkylene group (e.g., 1,4-dibromobutane) and heterocyclic ring (e.g., pyrrolidino) is formed. Similarly, bis(β-chloroethyl) ether will give an N-morpholino compound. Alkylation can also be carried out simultaneously with reduction, as e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

The compounds of the present invention where there is a double bond directly attached to the α-carbon atom of the 3-indolyl acetate (i.e. compound of Formula III) are prepared according to the process described in the following Flow Sheet 1:

FLOW SHEET 1

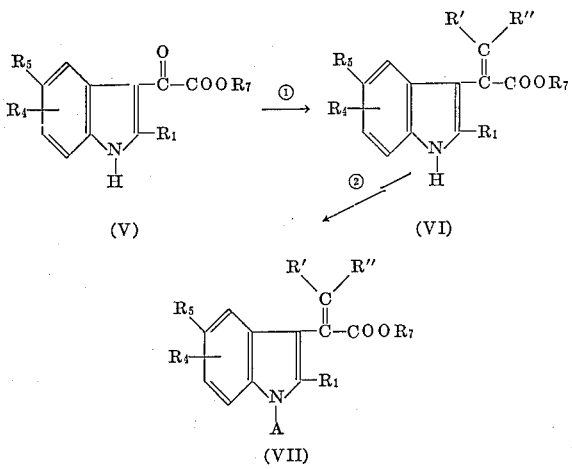

(V)   (VI)

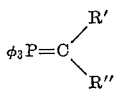

(VII)

*Step 1—Condensation.*—Formation of a Wittig type reagent, such as triphenylphosphonium alkene, $$\phi_3 P = C \diagup^{R'}_{R''}$$

where R' and R'' are selected from hydrogen or alkyl, in situ by reaction of triphenylphosphine with an alkyl halide $$\diagup^{R'}_{R''} CH-X$$

preferably the bromide, followed by the treatment of a strong base, such as n-butyl lithium, in an inert solvent, such as ether; reaction of this reagent with the glyoxyl compound, preferably the glyoxalate or glyoxalamide, in an inert solvent.

*Step 2—Acylation.*—To form the 1-aroyl or 1-heteroaroyl compound as described above.

In the above reaction sequence R$_7$ is amido or lower alkyl. The compound formed may be converted to an acid and then to an ester of this invention in accordance with procedures described above.

The Wittig reaction (Step 1) provides a conversion of the keto group of the glyoxalate or glyoxalamide (V) into a carbon to carbon double bond, to produce the unsaturated ester or amido (VI).

In accordance with the invention, Wittig reagents other than the methyltriphenylphosphonium bromide, also may be employed for introduction of the desired carbon to carbon double bond at the alpha carbon atom. These are described in detail in Annual Reports of the Chemical Society, vol. LVIII (1961), pp. 203–204.

While Flow Sheet 1 shows the acylation step carried out at the end of the synthesis, it will be understood that the steps can be reversed, that is, acylation can be performed on the starting material V, followed by condensation of the acylated intermediate with a Wittig reagent.

The 3-indolyl glyoxylates (V), preferably utilized as starting materials in the process outlined in Flow Sheet 1, are prepared in the manner described by Speeter in U.S. Patent 2,825,734.

A method for providing indolyl unsaturated lower aliphatic acids where the unsaturated bond is present in a position other than at the alpha carbon atom of the 3-indolyl acetate is illustrated in Flow Sheet 2 wherein R$_8$ is lower alkyl and R$_7$ has the same meaning as in Flow Sheet 1.

FLOW SHEET 2

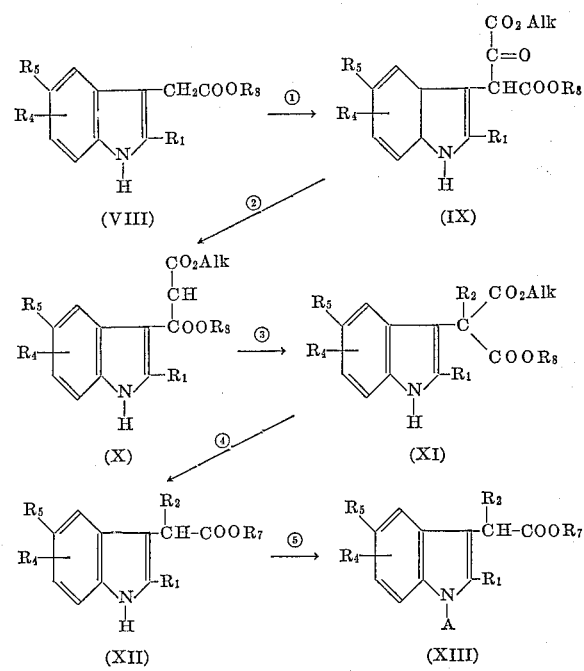

*Step 1—Condensation.*—α-(3-indolyl)-acetate with di-lower-alkyl oxalate, with a strong base, e.g., NaH, in an inert solvent, e.g., benzene, at elevated temperatures, e.g., at 80° C. Alk is lower alkyl, preferably the same group as R$_8$.

*Step 2—Pyrolysis.*—Elevated temperature, e.g., 100–200° C. in presence of powdered glass (loss of CO).

*Step 3—Alkylation.*—R$_2$X as alkylating agent R$_2$ is lower alkenyl, X is a halogen. Reaction is carried out in a solvent in presence of base.

*Step 4—*
 (a) *Hydrolysis* and *decarboxylation* of substituted malonic ester—as is well known in the art.
 (b) *Esterification* or *amidation* of a substitued α-(3-indolyl)-acetic acid.

*Step 5—Acylation.*—As described above.

The first step in the process according to Flow Sheet 2 is a condensation of an α-(3-indolyl)-acetate with a diloweralkyl oxalate in the presence of a strong base in an inert solvent at elevated temperatures to form the corresponding 2-oxalyl acetate.

The next step in the process is to convert the intermediate IX to the corresponding malonate X by the loss of carbon monoxide. The step is effected by heating IX in the presence of a solid material having a large surface area, such as powered glass.

The fourth step in the process involves hydrolysis and decarboxylation of the substituted malonic ester, followed by esterification or amidation to produce the corresponding α-R$_2$ substituted α-(3-indolyl)-acetate, for example, methyl-α-allyl-α-(2-methyl-3-indolyl)-acetate.

Finally, the intermediate XII is acylated as before to produce the final product XIII; e.g., methyl 1-p-methylthiobenzoyl-α-allyl-α-(2-methyl-3-indolyl)-acetate which can be converted to a compound of this invention in accordance with the procedures described above.

The following examples are given for purposes of illustration and not by way of limitation.

EXAMPLE 1

*Ethyl-2-(p-methylthiobenzoyl-2-methyl-5-methoxy-3-indolyl)-acrylate*

A. *Ethyl-α-(2-methyl - 5 - methoxy-3-indolyl) - acrylate.*—500 ml. of dry ether, 36.02 g. of methyltriphenylphosphonium bromide, made from equivalent amounts of triphenylphosphine and methyl bromide, and 94.36 ml. of 1.10 N n-butyl lithium are stirred for one hour at room temperature under nitrogen. 38 g. of ethyl-(2-methyl-5-methoxy-3-indolyl)-glyoxylate in 260 ml. of benzene and 500 ml. of dry ether are added, and stirring continued for one hour. The reaction mixture then is transferred to a pressure flask and heated in a closed flask at 65–70° C. for five hours. The liquid is poured from the pressure flask and the gum triturated with 500 ml. of 33% benzene in ether. The solutions are combined and washed with three 500 ml. portions of water, dried over sodium sulfate, filtered and concentrated in vacuo to a syrup. The syrup is slurried in benzene and charged onto a 200 g. column of activated alumina. Ethyl-α-(2-methyl-5-methoxy-3-indolyl)-acrylate is eluted by washing the column with 30% ether in petroleum ether and removing the eluting solvents by evaporation.

B. A suspension of 2.3 g. (0.046 m.) of 50% sodium hydride-mineral oil in 250 ml. of dimethylformamide is stirred for 20 minutes under nitrogen with ice-cooling. Then 8.64 g. (0.035 m.) of ethyl-α-(2-methyl-5-methoxy-3-indolyl)-acrylate is added and the mixture stirred for 20 minutes. 8.6 g. (0.046 m.) of p-methylthiobenzoyl chloride in 50 ml. of dimethylformamide is added dropwise over a period of 30 minutes. The mixture is stirred in an ice-bath for five hours under nitrogen. It is then poured into a mixture of 500 ml. of ether, 5 ml. of acetic acid and 1 l. of iced water. The organic products are extracted with 3×300 ml. of ether. The ether solutions are combined and washed with a large quantity of water, and dried over sodium sulfate. The solution is filtered, evaporated to near dryness and the residue charged onto a 300 g. alumina column. The ethyl-2-(1-p-methylthiobenzoyl-2-methyl-5-methoxy - 3 - indolyl)-acrylate is eluted with 10% ether in petroleum ether. It is obtained as a yellow oil on concentration of the eluates to dryness.

The p-methylthiobenzoyl chloride starting material is obtained by heating a mixture of 27 g. (0.15 m.) of p-methylthiobenzoic acid and 21.4 g. (0.18 m.) of thionyl chloride on a steam bath for one hour. About 20 ml. of benzene is then added and boiled off. The remaining solution is centrifuged and diluted with petroleum ether. On cooling, the acid chloride separates, M.P. 40–44° C.

When methyl-α-(2-methyl-5-methoxy-3-indolyl)-acrylate is employed as the starting material in the above process, there is obtained methyl-2-(1-p-methylthiobenzoyl-2-methyl-5-methoxy-3-indolyl)-acrylate.

EXAMPLE 2

The procedure of Example 1 is followed using the fol- methylthiobenzoyl chloride:

p-chlorobenzoyl chloride,
3,4,5-trimethoxybenzoyl chloride,
p-phenoxybenzoyl chloride,
p-trifluoroacetylbenzoyl chloride,
p-N,N-dimethylsulfamoylbenzoyl chloride,
3-furoyl chloride,
1-methyl-imidazol-5-carboxylic acid chloride,
1,3-dimethyl-2,3-dihydro-2-oxoimidazole-4-carboxylic acid chloride,
1-methyl-benzimidazol-2-carbonyl chloride,
5-fluoro-2-thenoyl chloride,
3-thenoyl chloride,
5-nitro-2-furoyl chloride,
1-methyl-indazole-3-carbonyl chloride,
1-methyl-6-nitroindazole-3-carbonyl chloride,
oxazole-4-carbonyl chloride,
benzoxazole-2-carbonyl chloride,
thiazole-4-carbonyl chloride,
thiazole-2-carbonyl chloride,
2-phenylthiazole-4-carbonyl chloride,
2-benzylmercaptothiazole-4-carbonyl chloride,
p-acetylbenzoyl chloride,
N,N-dimethyl-p-carbamoylbenzoyl chloride,
p-cyanobenzoyl chloride,
p-carbomethoxybenzoyl chloride,
p-formylbenzoyl chloride,
p-trifluoro-methyl-thiobenzoyl chloride,
N,N-dimethyl-p-sulfamoylbenzoyl chloride,
p-methylsulfinylbenzoyl chloride,
p-methylsulfonylbenzoyl chloride,
p-benzylthiobenzoyl chloride,
p-nitrobenzoyl chloride,
p-dimethyl-aminobenzoyl chloride,
p-acetaminobenzoyl chloride,
o-fluoro-p-chlorobenzoyl chloride,
o-methoxy-p-chlorobenzoyl chloride,
2,4,5-trichlorobenzoyl chloride, to produce the corresponding N-1 aroyl and N-1 heteroaroyl derivatives of the ethyl-2-(1-p-methylthiobenzoyl-2-methyl-5-methoxy-3-indolyl)-acrylate.

EXAMPLE 3

The procedure of Example 1 is followed using the following alkyl bromides in place of methyl bromide; ethyl bromide, propyl bromide, butyl bromide, and iso-propyl bromide to form the following compounds: ethyl-2-(1-p-methylthiobenzoyl - 2 - methyl - 5-methoxy - 3 - indolyl)-crotonate, ethyl - 2 - (1-p-methylthiobenzoyl - 2-methyl-5-methoxy-3-indolyl)-pent - 2 - enoate, ethyl-2-(1-p-methyl-thiobenzoyl-2-methyl-5 - methoxy - 3 - indolyl)-3-methyl-hex - 2 - enoate, and ethyl - 2 - (1-p-methylthiobenzoyl-2-methyl-5-methoxy-3-indolyl)-α-methyl crotonate.

When the aroyl and heteroaroyl chlorides used in Example 2 are employed in place of p-methylthiobenzoyl chloride, there are produced the corresponding N-1 aroyl and N-1 heteroaroyl derivatives of the above compounds.

EXAMPLE 4

The procedure of Examples 1–3 are followed using equivalent quantities of the following starting materials in place of ethyl-α-(2-methyl-5-methoxy-3-indolyl)-glyoxalate:

ethyl-α-(2-ethyl-5-methyl-3-indolyl)glyoxalate;
ethyl-α-(2-methyl-5-trifluoro-methyl-3-indolyl)-glyoxalate;
ethyl-α-(2-allyl-5-benzyloxy-3-indolyl)-glyoxalate;
ethyl-α-(2-phenyl-5-methoxy-3-indolyl)-glyoxalate;
ethyl-α-(2-p-methoxy-phenyl-5-chloro-3-indolyl)-glyoxalate;
α-(2-methyl-5-fluoro-3-indolyl)-glyoxalamide;
α-(2-p-chloro-phenyl-5-methoxy-3-indolyl)-glyoxalamide;
α-(5-methoxy-3-indolyl)-glyoxalamide;
ethyl-α-(5-benzyloxy-3-indolyl)-glyoxalate;
α-(2-methyl-5-allyloxy-3-indolyl)-glyoxalamide;
α-(5-ethoxy-3-indolyl)-glyoxalamide;
ethyl-α-(2-benzyl-5-methoxy-3-indolyl)-glyoxalate;
t-butyl-α-(5-benzyloxy-6-methyl-3-indolyl)-glyoxalate;
propyl-α-(6-methoxy-3-indolyl)-glyoxalate;
methyl-α-(2-methyl-5-nitro-6-fluoro-3-indolyl)-glyoxalate;
α-(5-benzyloxy-6-trifluoro-methyl-3-indolyl) glyoxalamide;
ethyl-α-(2-methyl-5-nitro-3-indolyl)-glyoxalate;
ethyl-α-(2-methyl-5-acetyl-3-indolyl)-glyoxalate;
ethyl-α-(2-methyl-5-butyryl-3-indolyl)-glyoxalate;
ethyl-α-[2-methyl-5-bis(benzyloxyethyl) amino-3-indolyl]-glyoxalate;
ethyl-α-[2-methyl-5-bis(benzyloxybutyl) amino-3-indolyl]-glyoxalate;
ethyl-α-[2-methyl-5-bis(benlyloxypentyl) amino-3-indolyl]-glyoxalate;

ethyl-α-[2-methyl-5-(1-pyrrolidino)-3-indolyl]-glyoxalate;
ethyl-α-[2-methyl-5-(4-methyl-1-piperazinyl)-3-indolyl]-glyoxalate;
ethyl-α-[2-methyl-5-(4-morpholinyl)-3-indolyl]-glyoxalate;
ethyl-α-(2-methyl-5-trifluoromethyl-3-indolyl)-glyoxalate;
ethyl-α-(2-methyl-5-chloro-3-indolyl)-glyoxalate;
ethyl-α-(2-methyl-5-bromo-3-indolyl)-glyoxalate;
ethyl-α-(2-methyl-5-fluoro-3-indolyl)-glyoxalate;
ethyl-α-(2-methyl-5-dimethylsulfamoyl-3-indolyl)-glyoxalate;
ethyl-α-(2-methyl-5-dipropylsulfamoyl-3-indolyl)-glyoxalate;
ethyl-α-(2-methyl-5-benzylthio-3-indolyl)-glyoxalate;
ethyl-α-(2-methyl-5-p-methylbenzylthio-3-indolyl)-glyoxalate;
ethyl-α-(2-methyl-5-p-methoxybenzylthio-3-indolyl)-glyoxalate;
ethyl-α-(2-methyl-5-p-chlorobenzylthio-3-indolyl)-glyoxalate;
ethyl-α-(2-methyl-5-p-fluorobenzylthio-3-indolyl)-glyoxalate;
ethyl-α-(2-methyl-5-benzyloxy-3-indolyl)-glyoxalate;
ethyl-α-(2-methyl-5-p-methylbenzyloxy-3-indolyl)-glyoxalate;
ethyl-α-(2-methyl-5-p-methoxybenzyloxy-3-indolyl)-glyoxalate;
ethyl-α-(2-methyl-5-p-propoxybenzyloxy-3-indolyl)-glyoxalate;
ethyl-α-(2-methyl-5-p-chlorobenzyloxy)-3-indolyl)-glyoxalate;
ethyl-α-(2-methyl-5-p-fluorobenzyloxy-3-indolyl)-glyoxalate;
ethyl-α-(2-methyl-5-cyclopropylmethoxy-3-indolyl)-glyoxalate;
ethyl-α-(2-methyl-5-cyclopropylpropoxy-3-indolyl)-glyoxalate;
ethyl-α-(2-methyl-5-methyloxy-3-indolyl)-glyoxalate;
ethyl-α-(2-methyl-5-cyclobutylmethoxymethyloxy-3-indolyl)-glyoxalate;
ethyl-α-(2-methyl-5-N,N-dimethyl-carbamyl-3-indolyl)-glyoxalate; and
ethyl-α-(2-methyl-5-allyl-3-indolyl)-glyoxalate;

to produce the corresponding substituted final products.

EXAMPLE 5

When the aroyl and heteroaroyl chlorides used in Example 2 are employed in place of p-methylthiobenzoyl chloride, there are produced the corresponding N-1 aroyl and N-1 heteroaroyl derivatives of the above compounds.

EXAMPLE 6

α-(1-p-chlorobenzoyl-2-methyl-5-methoxy-3-indolyl)-acrylic acid

A. α-(2 - methyl - 5 - methoxy - 3 - indolyl)-acrylic anhydride.—Dicyclohexylcarbodiimide (10 g.) is dissolved in a solution of α-(2-methyl-5-methoxy-3-indolyl)-acrylic acid (22 g.) in 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification in the next step.

B. t-Butyl α-(2-methyl-5-methoxy-3-indolyl)-acrylate.—t-Butyl alcohol (25 ml.) and fused zinc chloride (0.3 g.) are added to the anhydride from part A. The solution is refluxed for 16 hours and excess alcohol is removed in vacuo. The residue is dissolved in ether, washed several times with saturated bicarbonate, water, and saturated salt solution. After drying over magnesium sulfate, the solution is treated with charcoal, evaporated, and flushed several times with Skellysolve B for complete removal of alcohol. The residual oily ester is purified by alumina column chromatography using ether-petroleum ether (v./v. 10–30%) as eluent.

C. t-Butyl α-(1-p-chlorobenzoyl-2-methyl-5-methoxy-3-indolyl)-acrylate.—A stirred solution of ester (18 g.) in dry DMF (450 ml.) is cooled to 4° C. in an ice bath, and sodium hydride (4.9 g., 0.098 mole, 50% susp.) is added in portions. After 15 minutes, p-chlorobenzoyl chloride (15 g., 0.085 mole) is added dropwise during 10 minutes, and the mixture is stirred for 9 hours without replenishing the ice bath. The mixture is then poured into 1 l. of 5% acetic acid, extracted with a mixture of ether and benzene, washed thoroughly with water, bicarbonate, saturated salt, dried over magnesium sulfate, treated with charcoal, and evaporated to a residue. The crude product is chromatographed on 500 g. of acid-washed alumina using ether-petroleum ether (v./v. 20–50%) as eluent.

D. A mixture of 1 g. ester and 0.1 g. powdered porous plate is heated in an oil bath at 210° C. with magnetic stirring under a blanket of nitrogen for about 2 hours. No intensification of color (pale yellow) occurs during this period. After cooling under nitrogen, the product is dissolved in benzene and ether, filtered, and extracted with bicarbonate. The aqueous solution is filtered with suction to remove ether, neutralized with acetic acid, and then acidified weakly with dilute hydrochloric acid. The crude product is recrystallized from aqueous ethanol and dried in vacuo.

EXAMPLE 7

Ethyl-α-(1-p-methylthiobenzoyl-2-methyl-5-methoxy-3-indolyl)-α-allyl acetate

A. Ethyl α-ethoxy oxalyl-α-(2-methyl-5-methoxy-3-indolyl)-acetate.—To a solution of 2.3 g. of sodium in 200 ml. of dry ethanol is added 0.15 mole of diethyl oxalate and 0.1 mole of ethyl 2-methyl-5-methoxy-3-indolyl acetate. The mixture is refluxed gently on a steam bath for 2 hours and then cooled to room temperature. After dilution with 800 ml. of ether the precipitate is collected on a filter, washed with ether and dissolved in dilute sulfuric acid (1 N). The aqueous solution is extracted with three 100 ml. portions of ether. The ethereal solution is dried over sodium sulfate and evaporated to obtain the product.

B. Diethyl 2-methyl-5-methoxy-3-indolyl malonate.—The above glyoxalate is heated in an oil bath at 150–200° C. in the presence of powdered glass under nitrogen until the evolution of carbon monoxide is complete. The residual oil is purified by chromatography on a silica gel column using ether-petroleum ether (v./v. 50–100%) as eluent to obtain the product.

C. Diethyl allyl(2-methyl-5-methoxy-3-indolyl)-malonate.—To a solution 0.11 mole of sodium ethoxide and 0.1 mole of the above malonate in 300 ml. of dry ethanol is added dropwise 0.11 mole of allyl bromide with stirring. The mixture is then stirred at room temperature until neutral to phenolphthalein. The solution is concentrated in vacuo to about 100 ml., poured into water and extracted with ether. The ethereal solution is dried over sodium sulfate, evaporated and chromatographed on a silica gel column using ether-petroleum ether (v./v. 20–60%) as eluent.

D. α-(2 - methyl - 5-methoxy-3-indolyl)-α-allyl acetic acid.—The above malonate (0.05 mole) is dissolved in 150 ml. 90% aqueous ethanol containing 0.2 mole of sodium hydroxide and the solution is allowed to stand at room temperature for 18 hours. The solution is diluted with 100 ml. water, concentrated in vacuo to about 150 ml., poured into water, acidified with dilute sulfuric acid and warmed in a steam bath until the evolution of carbon dioxide is complete. The solution is cooled and extracted with ether. After drying over sodium sulfate, the ethereal solution is evaporated to obtain the product.

E. *Methyl α-(2 - methyl-5-methoxy-3-indolyl)-α-allyl acetate.*—The above acid is converted to its methyl ester by the treatment of 5% sulfuric acid in methanol at reflux temperature for 1 hour.

F. The procedure of Example 1 is followed using equivalent quantities of the above ester and p-methylthiobenzoyl chloride to produce the desired N-aroyl product.

EXAMPLE 8

The procedure of Example 7 is followed using equivalent quantities of the following alkenyl and alkynyl bromides: methallyl bromide, crotyl bromide, propargyl bromide, in place of allyl bromide to produce the corresponding α-alkenyl and α-alkynyl substituted compounds.

EXAMPLE 9

The procedure of Example 7 is followed using equivalent quantities of the aroyl halides of Example 2 in place of p-methylthiobenzoyl chloride to produce the corresponding N-1 aroyl and N-1 heteroaryol α-alkenyl and α-alkynyl substituted compounds.

EXAMPLE 10

*Methyl-(1-p-chlorobenzoyl-2-methyl-5-dimethylamine-3-indolyl)-acrylate*

A. *Methyl - (1 - p-chlorobenzoyl-2-methyl-5-dimethylamino-3-indolyl) glyoxalate.*—To a solution of 0.387 g. of methyl - α-(1-p-chlorobenzoyl-2-methyl-5-nitro-3-indolyl) glyoxalate in 20 ml. of distilled dimethoxyethane is added 1.5 ml. of glacial acetic acid and 0.5 ml. of 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to an oil.

B. The procedure of Example 1-A is followed to provide the desired product.

EXAMPLE 13

A. *Ethyl-α-(2-methyl-5-methoxy-3 - indolyl) - propionate.*—A solution of 25 g. of p-methoxyphenylhydrazine hydrochloride and 20 g. of ethyl α-methyl levulinate in 250 ml. of 2 N ethanolic hydrochloride is heated on a steam bath for a few minutes. An exothermic reaction takes place with the separation of ammonium chloride. The reaction flask is removed from the steam bath and the mixture allowed to reflux gently until the initial reaction subsides. The mixture is again heated on a steam bath under reflux for 30 minutes, and then concentrated in vacuo to a volume of about 80 ml. The concentrate is diluted with about 400 ml. of water and extracted with ether. The resulting ethereal extract is washed with a saturated solution of sodium bicarbonate, and with water, and dried over anhydrous sodium sulfate. The dried solution is filtered and evaporated to a dark brown syrup which is purified by chromatography over about 1 lb. of acid-washed alumina in a 2¼" I.D. column using mixtures of ether and petroleum ether (v./v. 1:9 to 1:1) as eluent. The light yellow syrup so obtained is distilled in a short-path distillation apparatus and the product collected at B.P. 150–153° C (0.25 mm.). The distillate of ethyl-α-(2-methyl-5-methoxy-3-indolyl)-propionate crystallizes on trituration with petroleum ether, M.P. 53–55.5° C. On crystallization from a mixture of ether and petroleum ether the melting point is unchanged.

Calcd. for $C_{15}H_{19}O_3N$: C, 68.94; H, 7.33; N, 5.36. Found: C, 69.23; H, 7.31; N, 5.60.

When the methyl, propyl, isopropyl or benzyl ester of α-methyl levulinic acid is employed in the above reaction in place of the ethyl ester, there is obtained methyl-α-(2 - methyl - 5 - methoxy-3-indolyl)-propionate, propyl - α - (2-methyl-5-methoxy-3-indolyl)-propionate, isopropyl - α - (2 - methyl-5-methoxy-3-indolyl)-propionate, or benzyl - α - (2 - methyl-5-methoxy-3-indolyl)-propionate, respectively. Alternatively, when an ester of levulinic acid is used as starting material in the above process, the corresponding ester of a α-(2-methyl-5-methoxy-3-indolyl)-acetic acid is obtained.

B. *Ethyl-α-(2,5-dimethyl-3-indolyl) - propionate.*—20 g. of p-methylphenylhydrazine hydrochloride and 20 g. of ethyl α-methyl levulinate are added to 250 ml. of 2 N ethanolic hydrogen chloride and the mixture warmed until reaction sets in. After the initial exothermic reaction stops, the mixture is refluxed for about ½ hour and then concentrated in vacuo to about ⅓ volume. 400 ml. of water are added and the aqueous solution extracted with ether. The ether extracts are washed with sodium bicarbonate solution, and with water, then dried over sodium sulfate. The ether solution is concentrated to a small volume in vacuo and chromatographed over acid-washed alumina (1 lb. of alumina in a 2¼" I.D. column). The material eluted with ether-petroleum ether (v./v. 9:1 to 1:1) is distilled in a shortpath distillation apparatus. Ethyl-α-(2,5-dimethyl-3-indolyl)-propionate distills at 150–170° C. (bath temp.)/1 mm., and crystallizes on trituration with petroleum ether, M.P. 88–88.5° C.

When a lower alkyl or benzyl levulinate is employed in place of ethyl α-methyl levulinate, lower alkyl- or benzyl-(2,5-dimethyl-3-indolyl)-acetate is produced.

EXAMPLE 14

*Ethyl-α-(1-p-methylthiobenzoyl-2-methyl-5-methoxy-3-indolyl)-propionate*

A suspension of 2.3 g. (0.046 m.) of 50% sodium hydride-mineral oil in 250 ml. of dimethylformamide is stirred for 20 minutes under nitrogen with ice-cooling. Then 8.64 g. (0.035 m.) of ethyl - α - (2 - methyl - 5 - methoxy - 3 - indolyl) - propionate is added and the mixture stirred for 20 minutes. 8.6 g. (0.046 m.) of p-methylthiobenzoyl chloride in 50 ml. of dimethylformamide is added dropwise over a period of 30 minutes. The mixture is stirred in an ice-bath for 5 hours under nitrogen. It is then poured into a mixture of 500 ml. of ether, 5 ml. of acetic acid and 1 l. of iced water. The organic products are extracted with 3×300 ml. of ether. The ether solutions are combined and washed with a larger quantity of water, and dried over sodium sulfate. The solution is filtered, evaporated to near dryness and the residue charged onto a 300 g. alumina column. The ethyl-α-1-p - methylthiobenzoyl-2-methyl-5-methoxy-3-indolyl)-propionate is eluted with 10% ether in petroleum ether. It is obtained as a yellow oil on concentration of the eluates to dryness.

The p-methylthiobenzoyl chloride starting material is obtained by heating a mixture of 27 g. (0.15 m.) of p-methylthiobenzoic acid and 21.4 g. (0.18 m.) of thionyl chloride on a steam bath for 1 hour. About 20 ml. of benzene is then added and boiled off. The remaining solution is centrifuged and diluted with petroleum ether. On cooling, the acid chloride separates, M.P. 40–44° C.

When methyl - (2 - methyl - 5 - methoxy-3-indolyl)-acetate is employed as the starting material in the above process, there is obtained methyl - (1 - p - methylthiobenzoyl-2-methyl-5-methoxy-3-indolyl)-acetate.

EXAMPLE 15

*Methyl-α-(1-p-chlorobenzoyl-2-methyl-5-methoxy-3-indolyl)-acetate*

To 3.9 g. (0.078 m.) of 51% sodium hydride-mineral oil suspended in 150 ml. of distilled dimethylformamide, in a 1 liter 3-neck flask, is added with stirring at 0° C. 9.5 g. (0.040 m.) of methyl - (2 - methyl-5-methoxy-3-indolyl)-acetate in 150 ml. of dimethylformamide. The mixture is allowed to stir for 1 hour and then 9.1 g.

(0.052 m.) of p-chlorobenzoyl chloride in 50 ml. of dimethylformamide is added dropwise over a period of 30 minutes. The reaction mixture is stirred another 30 minutes at 0° C. and then allowed to stand 12 hours in the cold.

The reaction mixture is then filtered and the solids washed with ether. The ether is added to the filtrate which is then washed with water and dried over sodium sulfate. After filtering off the sodium sulfate, approximately 75 g. of acid-washed alumina is added to the ethereal solution and this mixture concentrated to dryness. The indolo-coated alumina is then packed on top of a column of 400 g. of alumina. The column is eluted with petroleum ether containing increasing amounts of ethyl ether. Methyl - $\alpha$ - (1 - p - chlorobenzoyl - 2 - methyl-5-methoxy-3-indolyl)-acetate is eluted with 15% ether-petroleum ether. These latter eluates are combined and concentrated to dryness. Recrystallization of the residue from benzene-petroleum ether yields substantially pure methyl - $\alpha$ - (1 - p - chlorobenzoyl - 2 - methyl - 5-methoxy-3-indolyl)-acetate, M.P. 99–100° C.

Carrying out the above-noted process with ethyl-$\alpha$-(2-methyl-5-methoxy-3-indolyl)-propionate or benzyl-$\alpha$-(2,5-dimethyl-3-indolyl)-propionate yields, respectively, ethyl-$\alpha$ - (1 - p - chlorobenzoyl - 2 - methyl - 5 - methoxy - 3-indolyl)-propionate and benzyl-$\alpha$-(1-p-chlorobenzoyl-2,5-dimethyl-3-indolyl)-propionate.

EXAMPLE 16

*Ethyl - $\alpha$ - [1 - (o - methyl - p - methylthiobenzoyl) - 2-methyl - 5 - methoxy - 3 - indolyl] - propionate*

A mixture of 100 ml. of dimethylformamide, 5.2 g. (0.02 m.) of ethyl-$\alpha$-(2-methyl-5-methoxy-3-indolyl)-propionate and 1.2 g. (0.025 m.) of sodium hydride in mineral oil (50% dispersion) is stirred in an ice-bath under nitrogen for 1 hour. A solution of 4.0 g. (0.02 m.) of 2-methyl-4-methylthiobenzoyl chloride (prepared from the acid, M.P. 159–162° C., and thionyl chloride) and 25 ml. of dimethylformamide is then added during 0.5 hour, and stirring is continued for 16 hours at room temperature. The mixture is poured into 350 ml. of water, extracted with ether, and the ether solution washed with water, dried over magnesium sulfate, filtered and evaporated to dryness under reduced pressure. The residual oil is dissolved in petroleum ether (60–70° C.) and chromatographed on 250 g. of acid-washed alumina. The ethyl - $\alpha$ - [1 - (o - methyl - p - methylthiobenzoyl)-2-methyl-5-methoxy-3-indolyl]-propionate is eluted with 15% ether in petroleum ether and isolated as an oil.

EXAMPLE 17

*Ethyl-$\alpha$-(1-benzoyl-2-methyl-5-methoxy-3-indolyl) - propionate*

To a solution of 5.22 g. of ethyl-$\alpha$-(2-methyl-5-methoxy-3-indolyl)-propionate in 20 ml. of dimethylformamide is added a suspension of 1.2 g. of 51% sodium hydride in mineral oil in 40 ml. of dimethylformamide. After 1 hour of stirring at room temperature, a solution of 2.88 ml. of benzoyl chloride in 10 ml. of dimethylformamide is added to initiate a mild exothermic reaction with precipitation of sodium chloride. The reaction mixture is stirred for 6 hours followed by standing overnight. The mixture is poured into about 200 g. of ice and extracted with ether three times. The ethereal solution is washed with water, sodium bicarbonate and dried over potassium carbonate. After filtration the solution is evaporated to a syrup and chromatographed on a column of 100 g. of acid-washed alumina, using mixtures of benzene-petroleum ether (2:1 to 3:1 v./v.) as eluent. A total of 1.06 g. of ethyl - $\alpha$ - (1 - benzoyl - 2 - methyl - 5 - methoxy - 3-indolyl)-propionate is obtained as a thick yellow oil. The infrared spectrum shows no N—H absorption near the 2.8–3 region but shows strong C=O absorptions at 5.8 and 5.95 characteristic for ester and amide functional groups, respectively.

EXAMPLE 18

*Ethyl-$\alpha$-(1-p-chlorobenzoyl-2-methyl-5-methoxy - 3 - indolyl) - propionate*

13 g. of ethyl-(2-methyl-5-methoxy-3-indolyl)-propionate is added to a mixture of 2.5 g. of 51% sodium hydride-mineral oil emulsion in 240 ml. of dimethylformamide. The resulting mixture is stirred at room temperature for 30 minutes and then a solution of 8.75 g. of p-chlorobenzoyl chloride in 50 ml. of dimethylformamide is added slowely thereto over a 40-minute period. The mixture is then stirred in an ice-bath for 4 hours under nitrogen. It is then poured into a mixture of ether, acetic acid and water as described in Example 2. Following the work-up procedure and using a 200 g. column of alumina for the chromatography stop, and eluting with a mixture of 1:1 benzene-petroleum ether, ethyl-$\alpha$-(1-p-chlorobenzoyl - 2 - methyl - 5 - methoxy - 3 - indolyl)-propionate is obtained as a yellow oil.

EXAMPLE 19

*(1 - benzoyl - 2 - methyl - 5 - methoxy - 3 - indolyl)-acetic acid*

A. A solution of 15 g. of methyl-(2-methyl-5-methoxy-3-indolyl)-acetate and 0.2 g. of sodium in 60 ml. of benzyl alcohol is slowly fractionated over a period of 4½ hours through a Vigreux column to remove methanol. The excess benzyl alcohol is then removed by distillation at 60° C. (2.5 mm.) to give a residue of 18.6 g. of benzyl-(2-methyl-5-methoxy-3-indolyl)-acetate.

B. 10 g. of the benzyl ester obtained above is added to 3.3 g. of 51% sodium hydride-mineral oil emulsion in 260 ml. of dimethylformamide according to the procedure of Example 2. This mixture is treated as described in that example in 7.7 ml. of p-chlorobenzoyl chloride and the reaction mixture worked up by the above-described process using a chromatographic column of 340 g. of alumina and eluting with 20–30% ether in petroleum ether. From these eluates there is obtained benzoyl-(1-benzoyl-2-methyl-5-methoxy-3-indolyl)-acetate, M.P. 91–92° C.

C. 1.5 g. of the ester obtained in Part B above is added to 20 ml. of ethyl acetate containing a drop of acetic acid and reduced catalytically at room temperature in the presence of palladium on charcoal catalyst. When the reduction is complete the catalyst is removed by filtration and the filtrate evaporated to a crystalline residue. This residue is recrystallized from aqueous ethanol to give 1-benzoyl-(2-methyl-5-methoxy-3-indolyl)-acetic acid, M.P. 172–173° C. Alternatively, the residue obtained on removal of the reaction solvent may be purified by dissolving in chloroform and precipitating by addition of petroleum ether to the chloroform solution.

EXAMPLE 20

*Ethyl-$\alpha$-(1-p-fluorobenzoyl-2-methyl-5-methoxy-3-indolyl)-propionate*

10.5 g. of ethyl-$\alpha$-(2-methyl-5-methoxy-3-indolyl)-propionate is added to a suspension of 2.2 g. of 51% sodium hydride-mineral oil emulsion in 240 ml. of dimethyl-formamide. After stirring for 25 minutes, 7.5 g. of p-fluorobenzoyl chloride is added thereto slowly over a 40-minute period, and the resulting mixture stirred for 40 minutes at 10–15° C. The reaction mixture is then poured into 400 ml. of water and the product isolated as described in Example 4 to give substantially pure ethyl-$\alpha$-(1-p-fluorobenzoyl-2-methyl-5-methoxy-3-indolyl)-propionate.

When the above process is carried out by reacting the sodium salt of methyl-$\alpha$-(2-methyl-5-methoxy-3-indolyl)-propionate with p-trifluoromethylbenzoyl chloride, there is obtained methyl-$\alpha$-(1-p-trifluoromethylbenzoyl-2-methyl-5-methoxy-3-indolyl)-propionate.

EXAMPLE 21

The corresponding N-1 aroyl or heteroaryl derivatives of benzyl-α-(2-methyl-5-methoxy-3-indolyl)-propionate and benzyl-(2-methyl-5-methoxy-3-indolyl)-acetate are obtained by reacting together in equimolar amounts and according to the procedure of Example 15, the sodium salts of these esters and one of the compounds:

3,4,5-trimethoxy benzoyl chloride,
p-phenoxy benzoyl chloride,
p-trifluoroacetyl benzoyl chloride,
p-N,N-dimethylsulfamoyl benzoyl chloride,
3-furoyl chloride,
1-methylimidazol-5-carboxylic acid chloride,
1,3-dimethyl-2,3-dihydro-2-oxoimidazole-4-carboxylic acid chloride,
1-methyl-benzimidazole-2-carbonyl chloride,
5-fluoro-2-thenoyl chloride,
3-thenoyl chloride,
5-nitro-2-furoyl chloride,
1-methylindazole-3-carbonyl chloride,
1-methyl-6-nitro-indazole-3-carbonyl chloride,
oxazole-4-carbonyl chloride,
benzoxazole-2-carbonyl chloride,
thiazone-4-carbonyl chloride,
thiazole-2-carbonyl chloride,
2-phenylthiazole-4-carbonyl chloride,
2-benzylmercaptothiazole-4-carbonyl chloride,
p-acetylbenzoyl chloride,
N,N-dimethyl-p-carbamoyl benzoyl chloride,
p-cyanobenzoyl chloride,
p-carbomethoxybenzoyl chloride,
p-formylbenzoyl chloride,
p-trifluoromethylthiobenzoyl chloride,
N,N-dimethyl-p-sulfamoylbenzoyl chloride,
p-methylsulfinylbenzoyl chloride,
p-methylsulfonylbenzoyl chloride,
p-benzyl-thiobenzoyl chloride,
p-nitrobenzoyl chloride,
p-dimethylaminobenzoyl chloride,
p-acetaminobenzoyl chloride,
o-fluoro-p-chlorobenzoyl chloride,
o-methoxy-p-chlorobenzoyl chloride,
2,4,5-trichlorobenzoyl chloride.

The resulting 1-substituted indolyl esters are converted to the corresponding free acids by the procedure of Example 19.

EXAMPLE 22

*1-p-methylthiobenzoyl-2-methyl-5-methoxy-3-indolyl-α-propionic acid*

(A) *2-methyl-5-methoxy-3-indolyl-α-propionic anhydride.*—Dicyclohexylcarbodiimide (9 g. 0.044 mole) is dissolved in a solution of 2-methyl-5-methoxy-3-indolyl-α-propionic acid (21 g. 0.09 mole) and 200 ml. of THF, and the solution is allowed to stand at room temperature for 2 hours. The precipitated urea is removed by filtration, and the filtrate is evaporated in vacuo to a residue and flushed with Skellysolve B. The residual oil anhydride is used without purification.

(B) *t - Butyl -2 - methyl - 5 - methoxy - 3 - indolyl-α-propionate.*—t-Butyl alcohol (25 ml.) and fused zinc chloride (0.3 g.) are added to the above anhydride. The solution is refluxed for 16 hours, and excess alcohol is removed in vacuo. The residue is dissolved in ether, washed several times with saturated bicarbonate, water and saturated salt solution. After drying over magnesium sulfate the solution is treated with charcoal, evaporated, and flushed several times with Skellysolve B for complete removal of alcohol. The residual oil ester (14 g.) is used without purification.

(C) *t-Butyl 1-p-methylthiobenzoyl-2-methyl-5-methoxy-3-indolyl-α-propionate.*—A stirred solution of ester from part "B" (20 g. 0.69 mole) in 450 ml. of dry dimethylformamide is cooled to 4° C. in an ice bath and sodium hydride (5.2 g. 0.10 mole, 50% susp.) is added in portions. After the mixture is stirred for 10 minutes, p-methylthiobenzoyl chloride (M.P. 51° C.; 17 g. 0.091 mole) is added in portions during 10 minutes, and the mixture is stirred for 7 hours at room temperature without replenishing the ice bath. The mixture is then poured into 1 l. of 5% acetic acid, extracted with ether, washed thoroughly with water, bicarbonate, saturated salt solution, dried over magnesium sulfate, treated with charcoal, and evaporated in vacuo to a residue (33 g.). This is dissolved in ether, mixed with 100 g. of acid washed alumina, and evaporated in vacuo to dryness, which is placed above a column of 300 g. of acid washed alumina in Skellysolve B. After washing with Skellysolve B, the product is eluted with 5% ether-Skellysolve B, and is obtained as a yellow oil (11 g. 36%).

(D) *1 - p - methylthiobenzoyl - 2 - methyl - 5 - methoxy - 3 - indolyl - α - propionic acid.*—The pyrolysis is carried out in the same manner as with t-butyl 1-p-chlorobenzoyl-2-methyl-5-methoxy-3-indolyl acetate (of Example 6D). The product is recrystallized from aqueous ethanol or benzene-Skellysolve B; M.P. 175–6° C.

EXAMPLE 23

*1-p-chlorobenzoyl-2-methyl-5-methoxy-3-indolyl-α-propionic acid*

(A) To a solution of 20.0 g. (0.07 mole) of t-butyl-α-(2-methyl-5-methoxy-3-indolyl)-propionate in 270 ml. of dimethylformamide is added in small portions 7.0 g. (0.14 mole) of 51% sodium hydride in mineral oil under $N_2$ with stirring and ice-cooling. After 15 minutes, 17.5 g. (0.10 mole) of the p-chlorobenzoyl chloride is added dropwise, a white precipitate separates out almost immediately. The mixture is stirred at 0° C. for 2 hours and is allowed to stand in the cold room overnight. The next morning the mixture is filtered and diluted with ether. One-half of the solution is washed with water, sodium bicarbonate, water successively and dried over sodium sulfate. The dried solution is concentrated to a syrup which is chromatographed on 400 g. of acid-washed alumina. After mineral oil and trace of impurity is eluted by petroleum ether and 5% ether in petroleum ether, the desired product is obtained by elution with 10% ether in petroleum ether as yellow oil. The other half is similarly treated.

(B) The above ester and a few pieces of porous plate chips are placed in a flask submerged in an oil bath. A steady stream of $N_2$ is introduced into the test tube through the opening while the temperature of the oil bath is slowly raised to 215° C. After ½ hour at 215° C., the mixture is dissolved in ether, filtered and washed with sodium bicarbonate. The bicarbonate extract is acidified with dilute hydrochloric acid, and the precipitate is taken into ether, washed with water, dried over sodium sulfate and evaporated to dryness. The solid residue is recrystallized from a mixture of benzene and petroleum ether to give the desired acid, M.P. 87–88° C.

EXAMPLE 24

*Methyl-(1-isonicotinyl-2-methyl-5-methoxy-3-indolyl)-acetate*

In a 500 ml. round bottom flask (all equipment flame dried) is added 13.9 g. of p-nitrophenol and 12.3 g. isonicotinic acid in 250 ml. of dry tetrahydrofuran. Through a dropping funnel is added over 30 minutes 20.6 g. of dicyclohexylcarbodiimide in 100 ml. of dry tetrahydrofuran. The reaction is allowed to run overnight with stirring. The dicyclohexylurea which forms during the reaction is filtered. The filter cake is washed with dry tetrahydrofuran. The solution is evaporated to dryness. The solid is taken up in benzene and washed with sodium bicarbonate solution and then with water and dried over anhydrous sodium sulfate. The solution is concentrated under vacuum to dryness. The solid p-nitrophenylisonicotinate is then recrystallized from benzene, M.P. 216–227° C.

(B) In a 250 ml. round bottom flask (flame dried equipment) is placed at 0° C. with nitrogen, 100 ml. of dry dimethylformamide with 10.5 g. of methyl-α-(2-methyl-5-methoxy-3-indolyl) acetate. To this is added 2.5 g. of 50% sodium hydride mineral oil mixture. After the mixture is stirred for 30 minutes there is added over 15 minutes a solution of 11 g. of p-nitrophenylisonicotinate in 50 ml. dry dimethylformamide. The reaction mixture is stirred for 4 hours at 0° C. under nitrogen followed by stiring under nitrogen at room temperature overnight. The reaction mixture is then poured into an ice water-ether solution containing a few ml. of acetic acid and the layers are separated. The aqueous phase is washed with ether and the ether extracts are combined. To the ether layers is added a saturated solution of hydrogen chloride gas in dry ether. The ether is decanted off, leaving a heavy oil. The oil is washed with ether followed by an addition of aqueous sodium bicarbonate solution. The product is then extracted with ether. The ether layer is dried over anhydrous sodium sulfate and concentrated to dryness. The product is crystallized from dry ether, M.P. 114–115° C. *Analysis.*—Calc.: C, 67.45; H, 5.37; N, 8.28. Found: C, 67.67; H, 5.502; N, 8.14.

EXAMPLE 25

*Methyl-(2-methyl-5-nitro-3-indolyl)-acetate*

A solution of 40 g. of levulinic acid in 300 ml. of hot water is added to a solution of 65 g. of p-nitrophenyl hydrazine hydrochloride in 700 ml. of hot water with stirring. After about one-half hour, the hydrazone derivative is collected in a filter, washed with water and dried at 110° C. in vacuo. The yield is 84 g., M.P. 175–179° C.

An amount of 42 g. of the above hydrazone is added to a solution of 120 g. of fused zinc chloride in 100 ml. of absolute ethanol and the mixture is refluxed for 18 hours. The cooled solution is poured into dilute hydrochloric acid with stirring, and the insoluble gummy material separated is extracted with hot ethanol. The ethanolic extract is evaporated in vacuo to a syrup, which is redissolved in ether. The ether solution is extracted with 10% sodium carbonate several times. Acidification of the aqueous solution gave a crude product which recrystallizes from chloroform to give 2-methyl-5-nitro-3-indolyl)-acetic acid, M.P. 238° C.

The above acid is treated with a mixture of 3 g. of sulfuric acid and 40 ml. of methanol at the reflux temperature for 6 hours. The methyl ester is obtained as a yellow crystalline product, M.P. 132–40° C. after recrystallization from benzene.

Similarly methyl - α - (2 - methyl - 5 - nitro - 3 - indolyl)-propionate is prepared by using an equivalent amount of α-methyl levulinic acid as the starting material.

EXAMPLE 26

*Methyl(2-methyl-5-amino-3-indolyl)-acetate*

3 g. of methyl(2-methyl-5-nitro-3-indolyl)-acetate is dissolved in 300 ml. dry methanol and reduced in hydrogen in an autoclave with Raney nickel as catalyst. After the theoretical amount of hydrogen is taken up the catalyst is removed by filtration. The catalyst and reaction flask are washed with methanol. The methanol solution is evaporated to dryness. The product is crystallized from benzene, M.P. 144–145° C. *Analysis*—Calc.: C, 66.03; H, 6.47; N, 12.84. Found: C, 65.96; H, 6.29; N, 12.56.

EXAMPLE 27

*Methyl[2-methyl-5-(1′-pyrrolidino)-3-indolyl]-acetate*

In a 125 ml. flask is placed 80 ml. of ethanol. To this is added 1.0 g. of methyl(2-methyl-5-amino-3-indolyl)-acetate, 0.99 g. of 1,4-dibromobutane and 0.975 g. of anhydrous sodium carbonate. This mixture is stirred at reflux temperature in a nitrogen atmosphere for 6 hours. The reaction mixture is then filtered and the filtrate is concentrated in vacuo to a small volume and diluted with ether. This solution is then washed with water 2×, dried with anhydrous sodium sulfate and concentrated in vacuo to dryness. The product is absorbed on 6 g. of silica gel. The product is then chromatographed over 30 g. of silica gel using as elutant from v./v. 3:1 ether-petroleum ether to ether. The eluted material is combined and crystallized from benzene-Skellysolve B, M.P. 117–118° C. *Analysis*—Calc.: C, 70.56; H, 7.40; N, 10.29. Found: C, 70.77; H, 7.72; N, 10.00.

When ethylene dibromide is used instead of dibromobutane, the product obtained is the 5-(1-azacyclopropyl)-indolyl compound.

EXAMPLE 28

*Methyl(1-p-chlorobenzoyl-2-methyl-5-(1′-pyrrolidino)-3-indolyl acetate*

In a dry 125 ml. flask is placed 1.2 g. of methyl(2-methyl-5-(1′-pyrrolidino)-3-indolyl)-acetate in 60 ml. of dry dimethylformamide. To this solution, cooled to 0° C., is added 0.23 g. of 50% sodium hydride slurry in mineral oil. This mixture is stirred for 30 minutes. Then a solution of 0.8 g. of p-chlorobenzoyl chloride diluted with 5 ml. of dry dimethylformamide is added dropwise. This reaction is stirred for 4 hours at 0° C. under a nitrogen atmosphere. The reaction mixture is then stirred overnight at room temperature under a nitrogen atmosphere. The reaction mixture is added to an ice water-ether mixture containing a few milliliters of acetic acid.

The ether layer is separated and the aqueous layer is washed with ether. The combined ether layers are washed once with sodium carbonate and twice with water, dried over anhydrous sodium sulfate and evaporated in vacuo to an oil. The product is absorbed on 10 g. of silica gel and chromatographed from 60 g. silica gel. The product is collected using v./v. 1:3 to 1:1 ether-petroleum ether. The combined material is crystallized from ether, M.P. 62–64° C.

EXAMPLE 29

*Methyl-(1-p-chlorobenzoyl-2-methyl-5-nitro-3-indolyl)acetate*

In a dried 250 ml. flask is placed 3.9 g. of methyl-(2-methyl-5-nitro-3-indolyl)-acetate in 125 ml. dry dimethylformamide. To this solution cooled to 0° C. is added 0.8 g. of 50% sodium hydride-mineral oil. This is stirred under nitrogen for 30 minutes. To this is added dropwise 2.75 g. of p-chlorobenzoyl chloride in 15 ml. of dry dimethylformamide over a 5-minute period. The reaction mixture is stirred 4 hours at 0° C. under nitrogen and then stirred overnight at room temperature under nitrogen. It is then poured into an ice water-benzene solution containing a few milliliters of acetic acid. The benzene layer is separated and the aqueous layer is washed with benzene. The combined benzene layers are washed with sodium bicarbonate followed by water, dried over anhydrous sodium sulfate and concentrated to dryness in vacuo.

The product is crystallized from benzene-Skellysolve B, M.P. 170–171° C. *Analysis.*—Calc.: C, 59.00; H, 3.91; N, 7.24. Found: C, 59,24; H, 4.00; N, 7.39.

The corresponding propionate is formed when an equivalent amount of the corresponding methyl-α-(2-methyl-5-nitro-3-indolyl) propionate prepared in Example 26 is used as the starting material.

EXAMPLE 30

*Methyl-(1-p-chlorobenzoyl-2-methyl-5-dimethylamino-3-indolyl)-acetate*

To a solution of 0.387 g. of methyl-α-(1-p-chlorobenzoyl-2-methyl-5-nitro-3-indolyl) acetate in 20 ml. of distilled dimethoxyethane is added 1.5 ml. of glacial acetic acid and 0.5 ml. of a 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to an oil. *Analysis.—*Calc.: C, 65.50; H, 5.50; N, 7.28. Found: C, 65.66; H, 5.91; N, 7.46.

EXAMPLE 31

*Methyl-(1-p-chlorobenzoyl-2-methyl-5-acetamino-3-indolyl)-acetate*

To 0.388 g. of methyl-(1-p-chlorobenzoyl-2-methyl-5-nitro-3-indolyl)-acetate in 30 ml. of anhydrous ethyl acetate is added 0.306 g. acetic anhydride. The mixture is reduced with Raney nickel at room temperature and 40 p.s.i. After the theoretical amount of hydrogen has been absorbed, the catalyst is removed by filtration. The solution is concentrated in vacuo to a small volume and poured into an ice water-ether mixture. The ether layer is separated and the aqueous layer is washed with ether. The combined ether extracts are washed with sodium bicarbonate followed by water, dried with anhydrous sodium sulfate and concentrated in vacuo to dryness. The product is crystallized from benzene and ether, M.P. 176–177° C. *Analysis.*—Calc.: C, 63.25; H, 4.80; N, 7.02. Found: C, 63.40; H, 4.82; N, 6.89.

EXAMPLE 32

*Benzyl-(2-methyl-5-nitro-3-indolyl)-acetate*

In a dry 250 ml. flask is placed 80 ml. dry benzene and 20 ml. benzyl alcohol. To this is added 3.0 g. of 2-methyl-5-nitro-3-indolyl acetic acid and 0.2 g. of p-toluenesulfonic acid. This slurry (which clears on heating) is heated to reflux under nitrogen. The water formed during the reaction is collected in a Stark and Dean tube. The reaction is stopped when the distillate is clear (about 2 hours). The excess benzyl alcohol is removed in vacuo. The residue is dissolved in benzene and washed with sodium bicarbonate followed by water, dried over anhydrous magnesium sulfate and concentrated in vacuo. The product is absorbed on 15 g. of acid washed alumina and chromatographed over 75 g. of acid washed alumina. The product is eluted with v./v. 1:1–3:1 ether-benzene. The eluate is evaporated and the combined product is crystallized from benzene-Skellysolve B, M.P. 147–148° C. *Analysis.*—Calc.: C, 66.66; H, 4.97; N, 8.64. Found: C, 66.83; H, 4.77; N, 8.52.

EXAMPLE 33

*Benzyl-(1-p-chlorobenzoyl-2-methyl-5-nitro-3-indolyl)-acetate*

In a dry 125 ml. flask is placed 3.0 g. of benzyl-(2-methyl-5-nitro-3-indolyl)-acetate in 60 ml. of dry dimethylformamide. To this solution, cooled to 0° C. in a nitrogen atmosphere is added 0.475 g. of 50% sodium hydride-mineral oil. This is stirred for 30 minutes. Then 1.65 g. of p-chlorobenzoyl in 10 ml. of dry dimethylformamide is added dropwise over 25-minute period. The reaction mixture is stirred at 0° C. for 4 hours under a nitrogen atmosphere followed by stirring at room temperature under nitrogen overnight. It is then poured into an ice water-benzene mixture. The benzene layer is separated and the aqueous layer is washed with benzene. The combined benzene extracts are washed with sodium bicarbonate followed by water, dried with anhydrous sulfate and concentrated in vacuo to dryness. The product is crystallized from benzene-Skellysolve B, M.P. 166–167° C. *Analysis.*—Calc.: C, 64.86; H, 4.14; N, 6.05. Found: C, 64.78; H, 4.22; N, 5.91.

EXAMPLE 34

*Methyl-α-(1-p-chlorobenzoyl-2-methyl-5-amino-3-indolyl)-propionate*

0.025 m. of methyl-α-(1-p-chlorobenzoyl-2-methyl-5-nitro-3-indolyl)-propionate in 100 ml. of ethanol is hydrogenated in the presence of 120 mg. of 10% palladium on charcoal catalyst at 40 p.s.i. at room temperature. After 0.075 m. of hydrogen has been consumed, the hydrogenation is stopped, and the solution filtered to remove the catalyst. The filtrate is concentrated to dryness in vacuo to give methyl-α-(1-p-chlorobenzoyl-2-methyl-5-amino-3-indolyl)-propionate.

EXAMPLE 35

*Methyl-α-[1-chlorobenzoyl-2-methyl-5-(N-methylacetamido)-3-indolyl]-acetate*

Methyl - 1 - p - chlorobenzoyl - 2 - methyl-5-(N-methylacetamido)-3-indolyl acetate is added to a suspension of sodium hydride in dimethylformamide with stirring and ice-cooling. After one hour methyl iodide is added and the mixture is stirred overnight. The reaction mixture is poured into iced water and extracted with ether. Evaporation of the ethereal solution and chromatography of the residual oil on an alumina column, using 25–50% (v./v.) ether in petroleum ether as the eluent, gives methyl-α-[1-chlorobenzoyl - 2 - methyl - 5 - (N - methylacetamido)-3-indolyl]-acetate.

EXAMPLE 36

A. *Methyl - [1 - p - chlorobenzoyl - 2-methyl-5-bis(β-hydroxyethyl)-amino-3-indolyl]-acetate.*—A mixture of 0.02 mole of methyl-α-(1-p-chlorobenzoyl-2-methyl-5-amino-3-indolyl)-propionate, 0.044 mole of ethylene oxide and 0.03 mole of acetic acid in 300 ml. dimethoxyethane is heated to 100° C. for 18 hours in an autoclave. The mixture is then diluted with water and filtered to yield crude methyl - [1 - p - chlorobenzoyl-2-methyl-5-bis(β-hydroxyethyl) amino-3-indolyl]-propionate.

B. *Methyl - [1-p-chlorobenzoyl-2-methyl-5-(4'-methyl-1'-piperazinyl)-3-indolyl]-acetate.*—The product of A is stirred at 0° C. in pyridine with two mole proportions of p-toluenesulfonyl chloride until the reaction is substantially complete. The mixture is poured into water and the 5-bis-(p-toluenesulfonyloxyethyl) amino compound is isolated. This is dissolved in benzene and one mole proportion of methylamine is added. The mixture is allowed to stand at room temperature for 3 days. The mixture is poured into iced water containing two equivalents of sodium carbonate and extracted with ether immediately. Evaporation of the ether yields methyl-[1-p-chlorobenzoyl-2-methyl-5-(4'-methyl-1'-piperazinyl)-3-indolyl]-acetate.

Either of the above products, when used in the procedure of Example 19, gives the corresponding free acid.

EXAMPLE 37

*Methyl-[1-p-chlorobenzoyl-2-methyl-5-(4'-morpholinyl)-3-indolyl]-acetate*

A solution of tosyl chloride (0.1 mole) in 200 ml. benzene is added dropwise with stirring to a solution of methyl-α-[1-p-chlorobenzoyl-2-methyl - 5-bis(β-hydroxyethyl)amino-3-indolyl]-acetate (0.1 mole) and pyridine (0.3 mole) in 300 ml. benzene at room temperature over a period of one hour. The mixture is allowed to stand at room temperature for 18 hours, washed with water, dried over sodium sulfate and evaporated to a syrup. Chromatography of the syrup on an alumina column using 30–50% (v./v.) ether in petroleum ether as the eluent gives methyl-[1-p-chlorobenzoyl - 2 - methyl-5-(4'-morpholinyl)-3-indolyl]-acetate.

The above product, when used in the procedure of Example 17, gives the corresponding free acid.

EXAMPLE 38

A. *2-methyl - 5 - cyano - 3 - indolyl acetic acid methyl ester.*—A solution of p-cyano phenylhydrazine (0.1 mole)

and levulinic acid (0.1 mole) in 200 ml. concentrated hydrochloric acid is heated at 90° C. for 20 minutes and diluted with iced water (400 ml.). The crude product which separates is extracted with ether and chromatographed on a silica gel column to give 2-methyl-5-cyano-3-indolyl acetic acid using 20–50% (v./v.) ether and petroleum ether as the eluent.

The methyl ester is prepared by treatment with diazomethane in ether until the yellow of diazomethane persists and the mixture is evaporated.

B. *Methyl-α-(1-p-chlorobenzoyl - 2 - methyl-5-cyano-3-indolyl)-acetate.*—Alkylation of the ester (prepared in Example 37A above) in dimethylformamide with sodium hydride and p-chlorobenzoyl chloride, by the procedure of Example 2, gives methyl-α-(1-p-chlorobenzoyl-2-methyl-5-cyano-3-indolyl)-acetate.

C. *Methyl-α-(1-p-chlorobenzoyl - 2 - methyl-5-aminomethyl-3-indolyl)-acetate hydrochloride.*—The 5-cyano ester prepared in Example 38B is hydrogenated in ethanol in the presence of Raney nickel and 3 moles of anhydrous ammonia at 200 p.s.i. at room temperature to give, after filtration of the catalyst and evaporation of the reaction mixture in vacuo, methyl-α-(1-p-chlorobenzoyl-2-methyl-5-aminomethyl-3-indolyl)-acetate is isolated as its hydrochloride which can be recrystallized from aqueous ethanol.

D. *Methyl-(1-p-chlorobenzoyl - 2 - methyl-5-dimethylaminomethyl-3-indolyl-(acetate.*—Treatment of the above α-aminomethyl indole with 2 moles of methyl iodide gives the 5-dimethylaminomethyl derivative.

E. When the products of Examples 38C and 38D above are used in the procedure of Example 19, the corresponding free acids are obtained.

EXAMPLE 39

*α-(1-p-methylmercaptobenzoyl-2-methyl-5-methoxy-3-indolyl)-butyric acid*

When the procedure of Examples 13 and 14 are followed using ethyl α-ethyl levulinate in place of ethyl α-methyl levulinate, there is obtained successively ethyl α-(2-methyl-5-methoxy - 3 - indolyl) - butyrate and ethyl α-(1-p-methylmercaptobenzoyl - 2 - methyl-5-methoxy-3-indolyl)-butyrate. When the latter product is used in the procedure of Example 19 the corresponding butyric acid derivative is obtained.

The starting ethyl α-ethyl levulinate is prepared by alkylation of the sodio derivative of ethyl acetoacetate in ethanol with 1 m. of ethyl α-bromobutyrate, followed by hydrolysis and decarboxylation. The α-ethyl levulinic acid obtained is reesterified with 2 N ethanolic hydrogen chloride at reflux temperature for 18 hours.

EXAMPLE 40

*Methyl-1-(p-chlorobenzoyl)-2-phenyl-5-methoxy-3-indolyl-acetate*

A mixture of 0.145 mole of anhydrous sodium acetate and 0.183 mole of p-methoxyphenylhydrazine hydrochloride in 150 ml. of methanol is stirred under nitrogen for one-half hour. 3-benzoylpropionic acid (0.142 mole) in 80 ml. of methanol is added and the mixture is stirred for one hour. Anhydrous hydrogen chloride (0.50 mole) in 125 ml. of methanol is added over 20 minutes. The mixture is heated 2 hours on a steam bath, cooled and concentrated in vacuo. The residue is taken up in 500 ml. of benzene, washed with 150 ml. of 2.5 N HCl, followed by 150 ml. of saturated aqueous $NaHCO_3$, and finally water and then dried over $Na_2SO_4$. Evaporation of the benzene solution and chromatography of the crude product on 200 g. of acid-washed alumina, using ether-petroleum ether (20–50% ether by volume) as the eluent gives methyl-2-phenyl-5-methoxy-3-indolyl acetate, M.P. 120–120.5° C.

The above ester is used in the procedure of Example 3 in place of the corresponding 2-methyl indole, to yield methyl-1-p-chlorobenzoyl-2-phenyl-5-methoxy - 3-indolyl acetate.

When 3-p-fluorobenzoylpropionic acid, 3-m-trifluoromethylbenzoylpropionic acid and 3-p-methoxybenzoylpropionic acid is used in the above procedure, the correspondingly substituted 2-phenyl-3-indolyl acid esters are obtained.

EXAMPLE 41

*Ethyl-α-(1-benzoyl-2-methyl-5-methoxy-3-indolyl)-acrylate*

A. 500 ml. of dry ether, 36.02 g. of triphenylphosphonium bromide and 94.36 ml. of 1.10 N n-butyl lithium are stirred for 1 hour at room temperature under nitrogen. 38 g. of ethyl (2-methyl-5-methoxy-3-indolyl)-glyoxylate in 260 ml. of benzene and 500 ml. of dry ether are added, and stirring continued for 1 hour. The reaction mixture is transferred to a pressure flask and heated in a closed flask at 65–70° C. for 5 hours. The liquid is poured from the pressure flask and the gum triturated with 500 ml. of 33% benzene in ether. The solutions are combined and washed with three 500 ml. portions of water, dried over sodium sulfate, filtered and concentrated in vacuo to a syrup. The syrup is slurried in benzene and charged into a 200 g. column of activated alumina. Ethyl α-(2-methyl-5-methoxy-3-indolyl)-acrylate is eluted by washing the column with 30% ether in petroleum ether and removing the eluting solvents by evaporation.

The procedure of Example 24B is then followed using p-nitrophenylbenzoate in equivalent quantities in place of the p-nitrophenylisonicotinate, to give ethyl-α-(1-benzoyl-2-methyl-5-methoxy-3-indolyl) acrylate.

EXAMPLE 42

The corresponding N-1 aroyl or heteroaroyl derivatives of benzyl-α-(2-methyl-5-methoxy-3-indolyl propionate, benzyl-(2-methyl-5-methoxy-3-indolyl) acetate and benzyl-(2-methyl-5-nitro-3-indolyl) acetate are obtained by reacting these esters by the procedure of Example 24B with the p-nitrophenyl esters of the following acids, the p-nitrophenyl esters having been obtained from the acids by the procedure of Example 24A, using in each case the equivalent amount of the selected acid in place of the isonicotinic acid used in 24A and of its nitrophenyl ester used in 24B and equivalent quantities of the indolyl esters: 1-methylpyrryl-2-carboxylic acid, 5 - methylpyrazole - 3 - carboxylic acid, 1,5 - dimethyl-4 - bromopyrazole - 3 - carboxylic acid, 1 - phenylpyrazole - 4 - carboxylic acid, 1 - phenyl - 5 - pyrazolone-3 - carboxylic acid, 2 - phynl - 5 - methyloxazole - 4-carboxylic acid, isoxazole - 3 - carboxylic acid, 5-phenylisoxazole - 3 - carboxylic acid, 1,2 - benzoisothiazole - 3 - carboxylic acid, 1,2,3 - thiadiazole-4-carboxylic acid, 1 - methyl - 1,2,3 - triazole - 4 - carboxylic acid, nicotinic acid, picolinic acid, isonicotinic acid-N-oxide, 3 - chloroisonicotinic acid 6 - methoxynicotinic acid, 6 - phenylnicotinic acid, pyridialine - 4 - carboxylic acid, 3 - keto - 4 - methyl - 2 - phenyl - 2,3 - dihydropyridazine - 6 - carboxylic acid, cinnoline - 4 - carboxylic acid, 2 - methylmercapto - 4 - chloropyrimidine-5 - carboxylic acid, 2,4 - dichloropyrimidine - 5 - carboxylic acid, 2-methylmercapto - 4 - chloropyrimidine acid, p-difluoromethoxy benzoic acid (prepared by the action of difluorochloromethane on the p-hydroxybenzoate of benzyl alcohol followed by hydrogenation of the benzyl group). The esters so obtained are converted to the free acids by the procedure of Example 19C.

EXAMPLE 43

*Ethyl-α-(1-p-chlorobenzoyl-2-methyl-5-ethoxy-3-indolyl)-propionate*

The procedure of Example 13A is followed using an equivalent quantity of p-ethoxyphenylhydrazine hydrochloride in place of p-methoxyphenylhydrazine to give ethyl-α-(2-methyl-5-ethoxy-3-indolyl) propionate. When this is used in the procedure of Example 15 there is obtained ethyl - α - (1 - p - chlorobenzoyl - 2 - methyl - 5-methoxy -3-indolyl) propionate. This product, when used in the procedure of Example 19, yields the corresponding free α-indolyl propionic acid.

Similarly when p-propoxy and p-butoxy phenylhydrazine are used in the above procedures, the correspondingly 5-substituted indolyl acids are obtained.

When the procedure of Example 13A is followed using in place of the p-methoxyphenylhydrazine, equivalent amounts of p-ethylphenylhydrazine, p-butylphenylhydrazine, p - methyl - m - fluorohydrazine, p - fluorophenylhydrazine and p - fluoro - m - methoxyphenylhydrazine, each obtainable by diazotization of the corresponding p-substituted aniline and reduction of the diazo compound and the resultant indolyl ester is acylated by the procedure of Example 15 and further treated by the procedure of Example 17, the corresponding 5-substituted indolyl esters and acids are obtained.

EXAMPLE 44

The procedure of Example 13A is followed using an equivalent quantity of each of the following phenylhydrazines in place of the p-methoxyphenyl hydrazines: p - dimethylsulfamoylphenylhydrazine, p - benzylmercaptophenylhydrazine, p-vinylphenylhydrazine.

When the resulting indolyl acid is acylated by the procedure of Example 15, the corresponding 1-chlorobenzoyl indolyl acids are obtained.

EXAMPLE 45

*1-p-chlorobenzoyl-2-benzyl-3-indolylacetic acid*

The method of Stoll et al. [Hel. Chim. Acta 38, 1452 (1955)], is used with 2-benzylindole to obtain 2-benzyl-3-indolylacetic acid. To a solution of 0.1 mole of this acid in 200 ml. of tetrahydrofuran is added 0.049 mole of dicyclohexylcarbodiimide. The mixture is allowed to stand at room temperature for 2 hours, after which the precipitated urea is removed by filtration and the filtrate is evaporated in vacuo. The residue (crude anhydride of the acid) is flushed with petroleum ether and used as is in the next step.

t-Butyl alcohol (25 ml.) and fused zinc chloride (3 g.) are added to the crude anhydride and the excess alcohol is removed in vacuo after the mixture is refluxed 16 hours. The residue is dissolved in ether, washed with saturated brine and dried over $MgSO_4$. The solution is treated with charcoal and evaporated and the residue is flushed with petroleum ether to remove completely the alcohol. The residual t-butyl ester is used without purification.

A solution of 20.9 g. of the above ester in 450 ml. dry tetrahydrofuran is cooled to 4° C. and 4.9 g. of sodium hydride is added, as a 50% suspension in tetrahydrofuran, in small portions. After 15 minutes, 14 g. of p-chlorobenzoylchloride is added dropwise over 10 minutes. The mixture is stirred 9 hours while allowing it to warm to ambient temperature. It is then poured into 1 liter of 5% acetic acid and extracted with an ether benzene mixture (1:1). The extract is washed with water, $NaHCO_3$ aqueous and saturated brine and dried over $MgSO_4$. The solution is then treated with charcoal, filtered and evaporated. The residue is slurried in ether, filtered and evaporated. The crude product obtained as a residue is chromatographed on 600 g. of acid-washed alumina, using a mixture of ether-petroleum ether (10 to 50% ether by volume) as the eluent.

A mixture of 10 parts of the t-butyl-1-p-chlorobenzyl-2-benzyl-3-indolylacetate thus prepared and 1 part of porous plate is heated to 210° C. by an external oil bath under nitrogen for 2 hours. The mixture is cooled under nitrogen and the product is dissolved in benzene and ether (1:1). The solution is extracted with aqueous sodium bicarbonate. The extract is subjected to reduced pressure to remove ether and then acidified weakly with dilute HCl. The crude 1-p-chlorobenzoyl-2-benzyl-3-indole acetic acid is recrystallized from aqueous ethanol and dried in vacuo.

EXAMPLE 46

*Preparation of esters*

A. The esters of this invention are prepared from the free acids prepared as described in the preceding examples. In the preceding examples, those compounds which are described only as benzyl esters are converted to free acids by the procedure of Example 19C. Those which are described only as methyl, ethyl or other alkyl ester (other than t-butyl esters) are first converted to benzyl esters by the procedure of Example 19A and B. The benzyl ester is converted to free acid by the procedure of Example 19C. The t-butyl esters of the above examples are pyrolyzed to free acids using the procedure of Example 6D.

B. *Conversion of free acid to ester through the anhydride.*—A solution of 0.05 m. of N,N-dicyclohexylcarbodiimide in 60 ml. of tetrahydrofuran is added to an equivalent quantity of the free acid in 25 ml. of tetrahydrofuran containing a slight excess of the selected alcohol. The reaction mixture is shaken vigorously at about 25° C. for about 16 hours. The dicyclohexyl urea is filtered off and 2 ml. of glacial acetic acid is added to the filtrate. The solution is allowed to stand for one hour. The solution is filtered and about 200 ml. of ether is added to the filtrate. The filtrate is then extracted well with water, dried over anhydrous sodium sulfate and concentrated in vacuo to leave the desired product as a residue. It may be purified by chromatography on alumina using ether-petroleum ether as an eluent.

C. *Preparation of esters through selected levulinic ester.*—The procedures of Example 13A and B are used to form initially a 1-unsubstituted indole having the same ester group and the selected levulinate. The indole is then acylated in the 1-position using the selected acid halide in accordance with the procedure of Example 14.

D. The procedures of parts A, B and C of this example are used to prepare the following esters of the (3-indolyl)-aliphatic acids prepared in Examples 1 through 45:

propynyl, 2-methyl-butane-2-yl,
cyclohexyl, cyclopropylmethyl,
p-acetaminophenyl,
o-carboxyphenyl,
o-carbamoylphenyl,
β-methoxymethyl,
β-methoxyethyl,
β-ethexyethyl,
tetrahydrofufuryl,
1,3-dimethoxy-glyceryl,
glyceryl,
mannityl,
sorbityl,
β-diethylamino-ethyl,
β-dimethylaminoethyl,
α-dimethylaminopropyl,
2-dimethyl-3-diethylaminopropyl,
1,2-dimethyl-3-dimethylaminopropyl,
β-phenethyl,
β-(p-methoxyphenyl) ethyl,
3-phenylpropene-2-yl,
1-piperidinyl-(ethyl)
1-pyrrolidinyl-(ethyl)
1-pyrrolidinyl-(methyl),
1-morpholinyl-(ethyl),
4-dimethylamino-cyclohexyl,
1-methyl-2-pyrrolidinyl-(methyl),
1-methyl-2-piperidinyl-(methyl),
3-(1-ethyl piperidinyl) and N'-methyl-N-piperazinyl-(ethyl).

EXAMPLE 47

Preparation of acid addition salts

Acid addition salts of the free bases prepared in accordance with the foregoing examples are prepared in one of two ways.

In one procedure, which is especially applicable to volatile acids such as hydrogen chloride, the acid is bubbled into a solution of the free base in a solvent such as ether. The salt generally precipitates as it forms and may be recovered by filtration. If it does not precipitate it can be recovered by distilling the solvent.

In the second procedure a concentrated solution of the acid in methanol or ethanol is added to a concentrated solution of the free base in the same solvent. Again the addition salt generally precipitates on standing, but if necessary, it can be recovered by removal of the alkanol in vacuo.

Using one or both of these procedures, acid addition salts are prepared from the following acids: hydrochloric, hydrobromic, sulfuric, succinic, phosphoric, maleic, tartaric, citric, glycolic and salicylic.

I claim:

1. A compound selected from the group consisting of free bases and pharmaceutically acceptable acid addition salts of compounds represented by the formula:

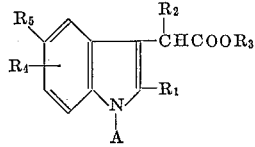

wherein

A is selected from the group consisting of benzoyl, naphthoyl,

wherein Het is selected from the group consisting of furyl, thienyl, imidazolyl, thiazolyl, benzimidazolyl, indazolyl, oxoimidazolyl, pyridazinyl, pyrazolonyl, prazolyl, oxazolyl, isoxazolyl, isothiazolyl, pyridyl, pyrimidinyl, pyrazinyl and substituted benzoyl, naphthoyl and

wherein said substituent is selected from the group consisting of halo, lower alkoxy, phenoxy, trifluoroacetyl, acetyl, formyl, dimethylcarbamoyl, cyano, carb-lower alkoxy, lower alkylthio, N-N dilower alkylsulfamoyl, methylsulfinyl, methylsulfonyl, nitro, di(lower alkyl)amino, dihalo, trihalo and dihalo lower alkoxy;

$R_1$ is selected from the group consisting of hydrogen, lower alkyl, lower alkenyl, methoxyphenyl, chlorophenyl, benzyl and phenyl;

$R_2$ is selected from the group consisting of hydrogen, lower alkyl, lower alkenyl and propargyl;

$R_3$ is selected from the group consisting of lower alkenyl, lower alkynyl, cyclopropylmethyl, lower alkoxy lower alkyl, poly lower alkoxy lower alkyl, dilower alkylamino lower alkyl, 1-piperidinyl(ethyl, 1-pyrrolidinyl(ethyl, 1-pyrrolidinyl(methyl), 1-morpholinyl(ethyl), 1-methyl-2-pyrrolidinyl(methyl), 1-methyl-2-piperidinyl(methyl), 3-(1-ethylpiperidinyl), N'-methyl-N-piperazinyl(ethyl), cyclopropylmethyl, p-acetaminophenyl, o-carboxyphenyl, o-carbamoylphenyl, β-phenethyl, β-(p-methoxyphenyl)ethyl, 3-phenylpropene-2-yl, tetrahydrofurfuryl and 4-dimethylaminocyclohexyl;

$R_4$ is selected from the group consisting of hydrogen, lower alkyl, lower alkoxy, fluorine and trifluoromethyl; and $R_5$ is selected from the group consisting of hydrogen, halogen, lower alkyl, amino lower alkyl, trifluoromethyl, lower alkoxy, benzyloxy, p-methylbenzyloxy, p-methoxybenzyloxy, p-propoxybenzyloxy, p-chlorobenzyloxy, p-fluorobenzyloxy, lower alkenyloxy, cyclopropylmethoxy, cyclopropylpropoxy, amino, lower alkylamino, dilower alkylamino, lower alkanolamino, cyano, nitro, 1-pyrrolidinyl, 4-methyl-1-piperazinyl, 4-morpholinyl, bis(hydroxy lower alkyl) amino, dilower alkylsulfamoyl, acetyl, bis(benzyloxyethyl) amino, benzylthio, p-methylbenzylthio, p-methoxybenzylthio, p-chlorobenzylthio, p-fluorobenzylthio, N,N-dimethylcarbamoyl, cyclobutylmethoxymethyloxy, 1-azacyclopropyl, ethylphenyl, butylphenyl, fluorophenyl, p-fluoro-m-methoxyphenyl and vinylphenyl.

2. β - Diethylaminoethyl α - (1 - p - chlorobenzoyl - 2-methyl-5-methoxy-3-indolyl)-acetate.

3. β - (M - morpholino) - ethyl α - (1 - p - chlorobenzoyl-2-methyl-5-methoxy-3-indolyl)-acetate.

4. β - Ethoxyethyl α - (1 - p - chlorobenzoyl - 2 - methyl-5-methoxy-3-indolyl)-acetate.

5. Phenyl α - (1 - chlorobenzoyl - 3 - methyl - 5 - methoxy-3-indolyl)-acetate.

6. β - Diethylaminoethyl α - (1 - p - chlorobenzoyl - 2-methyl-5-dimethylamino-3-indolyl)-acetate.

7. β - Ethoxyethyl α - (1 - p - chlorobenzoyl - 2 - methyl-5-dimethylamino-3-indolyl)-acetate.

References Cited by the Examiner

UNITED STATES PATENTS 3,161,654  12/1964  Shen _____ 260—319

ALEX MAZEL, *Primary Examiner.*

NICHOLAS S. RIZZO, HENRY R. JILES, *Examiners.*

J. TOVAR, *Assistant Examiner.*